UNITED STATES PATENT OFFICE.

CHARLES L. NORTON, OF MANCHESTER, MASSACHUSETTS, ASSIGNOR TO ASBESTOS WOOD COMPANY, A CORPORATION OF MAINE.

INSULATING MATERIAL AND METHOD OF PRODUCING THE SAME.

No. 865,606.　　　　　Specification of Letters Patent.　　　　　Patented Sept. 10, 1907.

Application filed February 23, 1907. Serial No. 358,894.

*To all whom it may concern:*

Be it known that I, CHARLES L. NORTON, a citizen of the United States, and a resident of Manchester, in the county of Essex and State of Massachusetts, have invented new and useful Improvements in Insulating Material and Methods of Producing the Same, of which the following is a specification.

My invention consists in a new material or composition suitable for use as an insulator in electrical apparatus, and in the method of producing such insulating material. Incidentally the practice of my new process results in the production of a material of superior mechanical strength and resistance to the action of water and may, therefore, commend itself to uses not necessarily connected with the construction or operation of electrical apparatus, although I believe that the chief value of my process and the product produced thereby lies in its adaptability to insulating purposes in the construction and operation of electrical apparatus.
In my application for Letters Patent of the United States filed June 7, 1906, Serial No. 320,670 for refractory materials and process for producing them there is set forth a process for making a refractory material of asbestos or asbestiform fiber bonded with magnesium hydrate. This refractory material is, I believe, the best available for the practice of my process presently to be described and the obtainment of the new product. Asbestiform fiber bonded with magnesium hydrate is a porous body which contains within its structure a proportion of magnesium hydroxid as a free oxidizing agent, and for this reason, as I believe, the refractory material of my application aforesaid is particularly well adapted to the practice of my present process.

I take a porous material preferably composed in large part of refractory substances and which contains within its body a free oxidizing agent, such as asbestiform fiber bonded with magnesium hydrate described in my application aforesaid, and impregnate it with a liquefiable, oxidizable hydrocarbon; and allow the hydrocarbon thus introduced into the pores of the body to set and harden in association with the materials with which the body is in whole or in part composed. More specifically, I take the refractory material described in my application aforesaid in its completed dry state and then further dry it by the application of heat as completely as possible without expelling the chemically combined water. Next, either by heating or by exhaustion with an air pump or both, I withdraw most of the air from the pores of the material and while the material is in a heated, dry and air-exhausted condition, I immerse it in a liquid hydrocarbon or hydrocarbon compound and when the liquid has penetrated the pores of the material, I remove it from the liquid, drain off the surplus thereof and allow the resulting product to dry for several days, say for a week, at a temperature of about 80° centigrade. Then, finally, the product is allowed to cool and is then found to be different in a pronounced degree from the original refractory material, in that its electrical resistance is increased many times as is also its dielectric strength, its mechanical strength is much greater, while its diminished porosity renders it practically non-hydroscopic.

The liquid or liquid compound which I employ for impregnating the refractory material referred to, is a liquefiable and oxidizable hydrocarbon, preferably one which is either very soft or a liquid at ordinary temperatures or under moderate heat. This may be a mixture of several hydrocarbons and I have found it to be immaterial whether or not the composition be a liquid at ordinary temperatures of the air, for the reason that after the refractory material is impregnated with the hydrocarbon, the mutual action of the refractory material and the hydrocarbon is such as to harden the hydrocarbon in the pores of the refractory material. For the impregnating liquid I may use pitches or asphalts, notably those which contain ceresin wax, among them the mineral ozocerite, or in fact, any other insulating hydrocarbon which, when heated and absorbed into the pores of the refractory material, becomes set or hardened through the action of the substances comprising the refractory material. I may, for instance, take the substance called "minwax", which is a mineral wax or pitch of about the consistency of molasses at an ordinary temperature and, as above described, impregnate the refractory material with it; the resulting product will be hard, capable of receiving a high polish and having a sharp clean fracture which shows that the alteration of the hydrocarbon occurs not only on the surface but throughout the body of the material wherever the hydrocarbon has penetrated. It appears that the magnesium hydroxid or oxid, or a slight amount of uncalcined magnesia in the refractory material described in my application aforesaid, combines with the hydrocarbon in such a way as to make it much harder than it ordinarily is. The operation appears to be equivalent in some measure to the well known process of distillation of the lighter and more volatile portions of the hydrocarbon, although in my process I accomplish the whole operation at a temperature much lower than that usually required to accomplish the distillation of the volatile products. It may be, on the other hand, that the magnesia compounds which are contained in the refractory material have a capacity for combination with the harder ingredients of the hydrocarbon pitches to the exclusion of the lighter and more volatile ones; such absorption and combination would be the equivalent, in its net result, for a distillation process although conducted at a lower temperature than that usually required for distillation.

I have found that if a soft asphalt or pitch or similar hydrocarbon be absorbed into a porous material other than that described in my application aforesaid, it can be hardened therein by actual distillation of the lighter and more volatile ingredients, but the loss in volume due to distillation leaves the pores of the material incompletely filled.

Whether or not the foregoing be the true explanation of the action which takes place, it is certain that when a liquefiable and oxidizable hydrocarbon of the class whereof ozocerite is a type, is absorbed in a liquid condition into the pores of the refractory material, such as described in my application aforesaid, and there allowed to harden in association with the free oxidizing agents which reside in the body of the material, it results in a product which is harder, stronger, capable of a higher polish, practically impervious to water, possessing great insulating powers and dielectric strength and capable of being worked with tools, and which has also this great advantage over other fiber and pitch insulators in that it has a refractory skeleton which, should the softening temperature of the hardened hydrocarbon be exceeded, will still serve to make the material keep its shape and retain a considerable proportion of its strength.

What I claim and desire to secure by Letters Patent is:

1. The process which consists in impregnating a porous body containing a free oxidizing agent, with a liquefiable, oxidizable hydrocarbon.

2. The process which consists in impregnating a porous body containing magnesium hydroxid with a liquefiable hydrocarbon, and allowing the hydrocarbon to harden in the body by association with the magnesium hydroxid.

3. The process which consists in impregnating a body composed of asbestiform fiber bonded with magnesium hydrate with a liquefiable hydrocarbon, and allowing the hydrocarbon to harden in the body by association with magnesium hydroxid.

4. The process which consists in impregnating a porous body containing magnesium hydroxid with a hydrocarbon of the class whereof ozocerite is a type, and allowing the hydrocarbon to harden in the body by association with the magnesium hydroxid.

5. The process which consists in impregnating a body composed of asbestiform fiber bonded with magnesium hydrate with a hydrocarbon of the class whereof ozocerite is a type, and allowing the hydrocarbon to harden in the body by association with magnesium hydroxid.

6. The process which consists in impregnating a porous body containing magnesium hydroxid with a liquefiable oxodizable hydrocarbon.

7. The process which consists in impregnating a body composed of asbestiform fiber bonded with magnesium hydrate, with a liquefiable oxidizable hydrocarbon.

8. The process which consists in heating a porous body containing magnesium hydroxid, impregnating it while heated with a liquefiable hydrocarbon, and allowing the hydrocarbon to harden in the body.

9. The process which consists in heating a body composed of asbestiform fiber bonded with magnesium hydrate, impregnating it while heated with a liquefiable hydrocarbon, and allowing the hydrocarbon to harden in the body.

10. The process which consists in heating a porous body containing magnesium hydroxid and impregnating it while heated with a liquefiable oxidizable hydrocarbon.

11. The process which consists in heating a body composed of asbestiform fiber bonded with magnesium hydrate, and impregnating it while heated with a liquefiable oxidizable hydrocarbon.

12. The product consisting of a porous body containing magnesium hydroxid, impregnated with an oxidized hydrocarbon.

13. The product consisting of asbestiform fiber bonded with magnesium hydrate, impregnated with an oxidized hydrocarbon.

14. The product consisting of a porous body containing magnesium hydroxid, impregnated with an oxidized hydrocarbon of the class whereof ozocerite is a type.

15. The product consisting of asbestiform fiber bonded with magnesium hydrate, impregnated with an oxidized hydrocarbon of the class whereof ozocerite is a type.

Signed by me at Boston, Massachusetts, this 15th day of February, 1907.

CHARLES L. NORTON.

Witnesses:
JOSEPH T. BRENNAN,
CHARLES D. WOODBERRY.